United States Patent
Dash et al.

(10) Patent No.: US 12,498,910 B2
(45) Date of Patent: Dec. 16, 2025

(54) TRAINING SYNTAX-AWARE LANGUAGE MODELS WITH AST PATH PREDICTION

(71) Applicant: Oracle International Corporation, Redwood Shores, CA (US)

(72) Inventors: Pritam Dash, Vancouver (CA); Arno Schneuwly, Effretikon (CH); Saeid Allahdadian, Vancouver (CA); Matteo Casserini, Zurich (CH); Felix Schmidt, Baden-Dattwi (CH)

(73) Assignee: Oracle International Corporation, Redwood Shores, CA (US)

( * ) Notice: Subject to any disclaimer, the term of this patent is extended or adjusted under 35 U.S.C. 154(b) by 310 days.

(21) Appl. No.: 18/202,564

(22) Filed: May 26, 2023

(65) Prior Publication Data

US 2024/0345815 A1    Oct. 17, 2024

Related U.S. Application Data

(60) Provisional application No. 63/459,014, filed on Apr. 13, 2023.

(51) Int. Cl.
G06F 8/41    (2018.01)

(52) U.S. Cl.
CPC .................................. *G06F 8/427* (2013.01)

(58) Field of Classification Search
CPC ...... G06F 8/425; G06F 8/427; G06F 16/9024; G06N 3/08; G06N 3/045
See application file for complete search history.

(56) References Cited

U.S. PATENT DOCUMENTS

| | | | |
|---|---|---|---|
| 11,656,851 B2* | 5/2023 | Clement | G06N 3/045 717/106 |
| 12,073,195 B2 | 8/2024 | Duan | |

(Continued)

FOREIGN PATENT DOCUMENTS

| | | | | |
|---|---|---|---|---|
| CN | 112381280 B | * | 1/2023 | G06Q 10/04 |
| EP | 2128798 | | 12/2009 | |

OTHER PUBLICATIONS

Zeng, Jie, et al., "Fast Code Clone Detection Based on Weighted Recursive Autoencoders", IEEE Access, vol. 7; pp. 125062-125078, 2019. doi: 10.1109/ACCESS.2019.2938825, published Sep. 2, 2019, 17pgs.

(Continued)

*Primary Examiner* — Hanh Thi-Minh Bui
(74) *Attorney, Agent, or Firm* — Hickman Becker Bingham Ledesma LLP

(57) ABSTRACT

In an embodiment, a computer stores and operates a logic encoder that is an artificial neural network that infers a fixed-size encoded logic from textual or tokenized source logic. Without machine learning, a special parser generates a parse tree that represents the source logic and a fixed-size correctly encoded tree that represents the parse tree. For finetuning the logic encoder, an encoded tree generator is an artificial neural network that accepts the fixed-size encoded logic as input and responsively infers a fixed-size incorrectly encoded tree that represents the parse tree. The neural weights of the logic encoder (and optionally of the encoded tree generator) are adjusted based on backpropagation of error (i.e. loss) as a numerically measured difference between the fixed-size incorrectly encoded tree and the fixed-size correctly encoded tree.

14 Claims, 4 Drawing Sheets

(56) References Cited

U.S. PATENT DOCUMENTS

| | | |
|---|---|---|
| 12,130,809 B2 | 10/2024 | Miller |
| 2017/0255611 A1 | 9/2017 | Kubosawa |
| 2021/0185066 A1 | 6/2021 | Shah |
| 2022/0197917 A1 | 6/2022 | Schneuwly et al. |
| 2022/0198294 A1* | 6/2022 | Schneuwly ....... G06F 16/24564 |
| 2022/0261228 A1 | 8/2022 | Schneuwly et al. |
| 2024/0289606 A1* | 8/2024 | Wang ....................... G06N 3/08 |

OTHER PUBLICATIONS

White, Martin, et al., "Deep Learning Code Fragments for Code Clone Detection", 31st IEEE/ACM ICASE 2016, dx.doi.org/10.1145/2970276.2970326, pp. 87-98, publ Aug. 25, 2016, 12pgs.

Wang, Xin, et al., "SynCoBERT: Syntax-Guided Multi-Modal Contrastive Pre-Training for Code Representation", https://arxiv.org/abs/2108.04556, Sep. 9, 2021, 9pgs.

Jiang, Lingxiao, et al., "Deckard: Scalable and Accurate Tree-based Detection of Code Clones", 29th ICSE '07, doi: 10.1109/ICSE.2007.30, pp. 96-105, May 24, 2007, 10pgs.

Gao, Yi, et al., "TECCD: A Tree Embedding Approach for Code Clone Detection", 2019 IEEE CSME, doi: 10.1109/ICSME.2019.00025, pp. 145-156, 2019, 12pgs.

Fang, Chunrong, et al., "Functional code clone detection with syntax and semantics fusion learning", Proc of the 29th ACM SIGSOFT ISSTA '20, pp. 516-527, doi: 10.1145/3395363.3397362, Jul. 18, 2020, 12pgs.

Johnson, Jeff, et al., "Billion-scale similarity search with GPUs", https://arxiv.org/pdf/1702.08734.pdf, Feb. 28, 2017, 12pgs.

Feng, Zhangyin, et al., "CodeBERT: A Pre-Trained Model for Programming and Natural Languages", Findings of the Assoctn for Computnl Linguistics: EMNLP 2020, pp. 1536-1547, https://doi.org/10.18653/v1/2020.findings-emnlp.139, Nov. 16, 2020, 12pgs.

Chen, Mark, et al., "Evaluating Large Language Models Trained on Code", https://arxiv.org/abs/2107.03374, Jul. 14, 2021, 35pgs.

"Stack Overflow—Where Developers Learn, Share, & Build Careers", Stack Exchange Inc., https://stackoverflow.com/, 2023, 13pgs.

"Stack Exchange Data Dump: Stack Exchange, Inc.", https://archive.org/details/stackexchange, 2023, 8pgs.

"ChatGPT: Optimizing Language Models for Dialogue", GOpenAI, LLC, https://chat.openai.com/, 2023, 1pg.

Li, Raymond et al., "Starcoder: may the source be with you!", CoRR, abs/2305.06161, 2023, available: https://doi.org/10.48550/arXiv.2305.06161.

Alon, Uri et al., "code2vec: learning distributed representations of code", Proc. Acm Program. Lang., 3(POPL):40:1-40:29, 2019.

Ben Allal, Loubna et al., "Santacoder: don't reach for the stars!", CoRR, abs/2301.03988, 2023, available: https://doi.org/10.48550/arXiv.2301.03988.

Brown et al. "Language models are few- shot learner", Advances in Neural Information Processing Systems 33: Annual Conference on Neural Information Processing Systems 2020, NeurIPS 2020.

Chen, Mark et al., "Evaluating large language models trained on code", CoRR, abs/2107.03374, 2021, available: https://arxiv.org/abs/2107.03374.

Chowdhery, Aakanksha et al., "Palm: Scaling language modeling with pathways", CORR, abs/2204.02311, 2022, available: https://doi.org/10.48550/arXiv.2204.02311.

Devlin, Jacob et al., "BERT: Pre-training of Deep Bidirectional Transformers for Language Understanding", Proceedings of the 2019 Conference of the North American Chapter of the Association for Computational Linguistics, Jun. 2-7, 2019, 4171-4186.

Guo, Daya et al., "Graphcodebert: Pre-training code representations with data flow", 9th International Conference on Learning Representations, ICLR 2021, Austria, May 3-7, 2021, available: https://openreview.net/forum?id=jLoC4ez43PZ.

Guo, Daya et al., "Unixcoder: Unified cross-modal pre-training for code representation", Proceedings of the 60th Annual Meeting of the Association for Computational Linguistic, ACL 2022, May 22-27, 2022, pp. 7212-7225.

Izadi, Maliheh et al., "Codefill: Multi-token code completion by jointly learning from structure and naming sequences", Proceedings of the 44th International Conference On Software Engineering, ICSE '22, New York, NY, USA, 2022, pp. 401-412.

Jiang, Xue et al., "A tree-based pre-trained model for programming language", Proceedings of the Thirty-Seventh Conference on Uncertainty in Artificial Intelligence, Jul. 27-30, 2021, vol. 161 Of Proceedings of Machine Learning Research, pp. 54-63.

Alon, Uri et al., "code2seq: Generating sequences from structured representations of code", 7th International Conference on Learning Representations, ICLR 2019, New Orleans, LA, USA, May 6-9, 2019, OpenReview.net, 2019.

Kim, Seohyun et al., "Code prediction by feeding trees to transformers", 43rd IEEE/ACM International Conference on Software Engineering, ICSE 2021, Madrid, Spain, May 22-30, 2021, pp. 150-162, available: https://doi.org/10.1109/ICSE43902.2021.00026.

Zugner, Daniel et al., "Language-Agnostic Representation Learning of Source Code from Structure and Context", 9th International Conference on Learning Representations, ICLR 2021, May 3-7, 2021, available: https://openreview.net/forum?id=Xh5eMZVONGF.

Liu, Yapeng et al., "Improving code completion by sequence features and structural features", Proceedings of the 4th World Symposium on Software Engineering, WSSE '22, 2022, pp. 51-58.

OpenAI, "GPT-4 technical report", CoRR, abs/2303.08774, 2023, available: https://doi.org/10.48550/arXiv.2303.08774.

Peng, Han et al., "Integrating Tree Path in Transformer for Code Representation", Advances in Neural Information Processing Systems, vol. 34, 2021, pp. 9343-9354.

Radford, Alec et al., "Improving language understanding by generative pre-training", 2018.

Radford, Alec et al., "Language models are unsupervised multitask learners", Openai Blog, 1(8):9, 2019.

Tang, Ze, et al., "Ast-trans: Code summarization with efficient tree-structured attention", 2022 IEEE/ACM 44th International Conference on Software Engineering (ICSE), 2022, pp. 150-162.

Touvron, Hugo et al., "Llama: Open and efficient foundation language models", CoRR, abs/2302.13971, 2023, available: https://doi.org/10.48550/arXiv.2302.13971.

Vaswani, Ashish et al., "Attention is all you need", Advances in Neural Information Processing Systems 30: Annual Conference on Neural Information Processing Systems 2017, Dec. 4-9, 2017, Long Beach, CA, USA, pp. 5998-6008.

Wang, Xiao et al., "Heloc: hierarchical contrastive learning of source code representation", Proceedings of the 30th IEEE/ACM International Conference on Program Comprehension, ICPC 2022, Virtual Event, May 16-17, 2022, pp. 354-365.

Wang, Xin et al., "SynCoBERT: Syntax-Guided Multi-Modal Contrastive Pre-Training for Code Representation", 2021.

Wang, Yanlin et al., "Code completion by modeling flattened abstract syntax trees as graphs", Thirty-Fifth AAAI Conference on Artificial Intelligence, AAAI 2021, Feb. 2-9, 2021, pp. 14015-14023.

Kanade, Aditya et al., "Learning and Evaluating Contextual Embedding of Source Code", Proceedings of the 37th International Conference on Machine Learning, Jul. 13-18, 2020, vol. 119 of Proceedings of Machine Learning Research, pp. 5110-5121.

He et al., "A Reusable SQL Injection Detection Method for Java Web Applications", KSII Transactions on Internet and Information Systems vol. 14, No. 6, dated Jun. 2020, 15 pages.

Alon et al., "A General Path-Based Representation for Predicting Program Properties" dated Apr. 22, 2018, 16 pages.

Alon, et al., "code2vec: Learning Distributed Representations of Code", Proc. ACM Program. Lang., vol. 3, No. POPL, Article 40. Publication date: Jan. 2019, 29 pages.

Apel et al., "Learning SQL for Database Intrusion Detection using Context-sensitive Modelling", dated 2009, 33 pages.

Bockermann et al., "Learning SQL for Database Intrusion Detection Using Context-Sensitive Modelling", DIMVA dated 2009, LNCS 5587, 10 pages.

Cai et al., "An Abstract Syntax Tree Encoding Method for Cross-Project Defect Prediction", IEEE, dated Nov. 15, 2019, 10 pages.

(56) References Cited

OTHER PUBLICATIONS

"Tree-sitter", Introduction, https://tree-sitter.github.io/tree-sitter/, last accessed Jun. 9, 2023, 4pgs.

Guo, Daya, et al., "UniXcoder: Unified Cross-Modal Pre-training for Code Representation", https://arxiv.org/abs/2203.03850, Mar. 8, 2022, 14pgs.

Zugner, Daniel, et al., "Language-Agnostic Representation Learning of Source Code from Structure and Context", ICLR 2021, https://arxiv.org/abs/2103.11318, Mar. 21, 2021, 22pgs.

Hinton, Geoffrey, et al., "Distilling the Knowledge in a Neural Network", https://arxiv.org/abs/1503.02531, Mar. 9, 2015, 9pgs.

Jimenez et al., "On the Impact of Tokenizer and Parameters on N-Gram Based Code Analysis", dated 2018, 12 pages.

Mou et al., "Building Program Vector Representations for Deep Learning", dated Sep. 11, 2014, 11 pages.

Parr, Terence, "The Definitive ANTLR 4 Reference", The Pragmatic Bookshelf, copyright 2012 The Pragmatic Programmers, LLC, www.it-ebooks.info, book version Jan. 2013, 322pgs.

Yamaguchi et al., "Generalized Vulnerability Extrapolation using Abstract Syntax Trees", ACSAC '12 Dec. 3-7, 2012, Orlando, Florida USA, 10 pages.

Zhang, Jian, et al., "A Novel Neural Source Code Representation Based on Abstract Syntax Tree", 2019 IEEE/ACM 41st ICSE, doi: 10.1109/ICSE.2019.00086, pp. 783-794, May 25, 2019, 12pgs.

Devlin, Jacob, et al., "BERT: Pre-training of Deep Bidirectional Transformers for Language Understanding", https://arxiv.org/abs/1810.04805, May 24, 2019, 16pgs.

\* cited by examiner

TRAINING SYNTAX-AWARE LANGUAGE MODELS WITH AST PATH PREDICTION

CROSS-REFERENCE TO RELATED APPLICATION; BENEFIT CLAIM

This application claims the benefit of Provisional Application 63/459,014, filed Apr. 13, 2023, the entire contents of which is incorporated by reference under 35 U.S.C. § 119(e).

FIELD OF THE INVENTION

The present invention relates to natural language processing (NLP). Herein is an encoded tree generator for finetuning a pretrained logic encoder that infers a fixed-size encoded logic from source logic.

BACKGROUND

A major difference between various compilable programming languages and natural languages is in that programming languages always follow strict deterministic syntaxes which are defined in accordance with a set of grammar rules. Advanced language models such as machine learning transformers are unwieldy for source codes, and there is a very large amount of data and training needed to train such large language models.

Transformers and other machine learning models do not readily accept programing language artifacts such as a parse tree. State of the art feature encoding cannot densely encode a logical tree without losing important information, and a sparse encoding wastes space. Whether dense or sparse, an encoding of a logical tree may be difficult for a machine learning model to analyze and recognize, and inference accuracy based on a tree may be low (i.e., poor) with a state of the art encoding.

State of the art feature encoding of a tree may entail lossy flattening by which important tree topology details may be lost (i.e. not encoded). For example, the state of the art may decompose a logical tree into an array of small tree fragments also known as dependencies. So difficult is feature engineering for a linguistic dependency tree that best of breed natural language processing (NLP) language model BERT (bidirectional encoder representations from transformers) forgoes parsing and instead accepts lexical tokens. However due to not parsing, BERT's accuracy is suboptimal, which may decrease accuracy of production inferencing.

DETAILED DESCRIPTION

Figure 1:
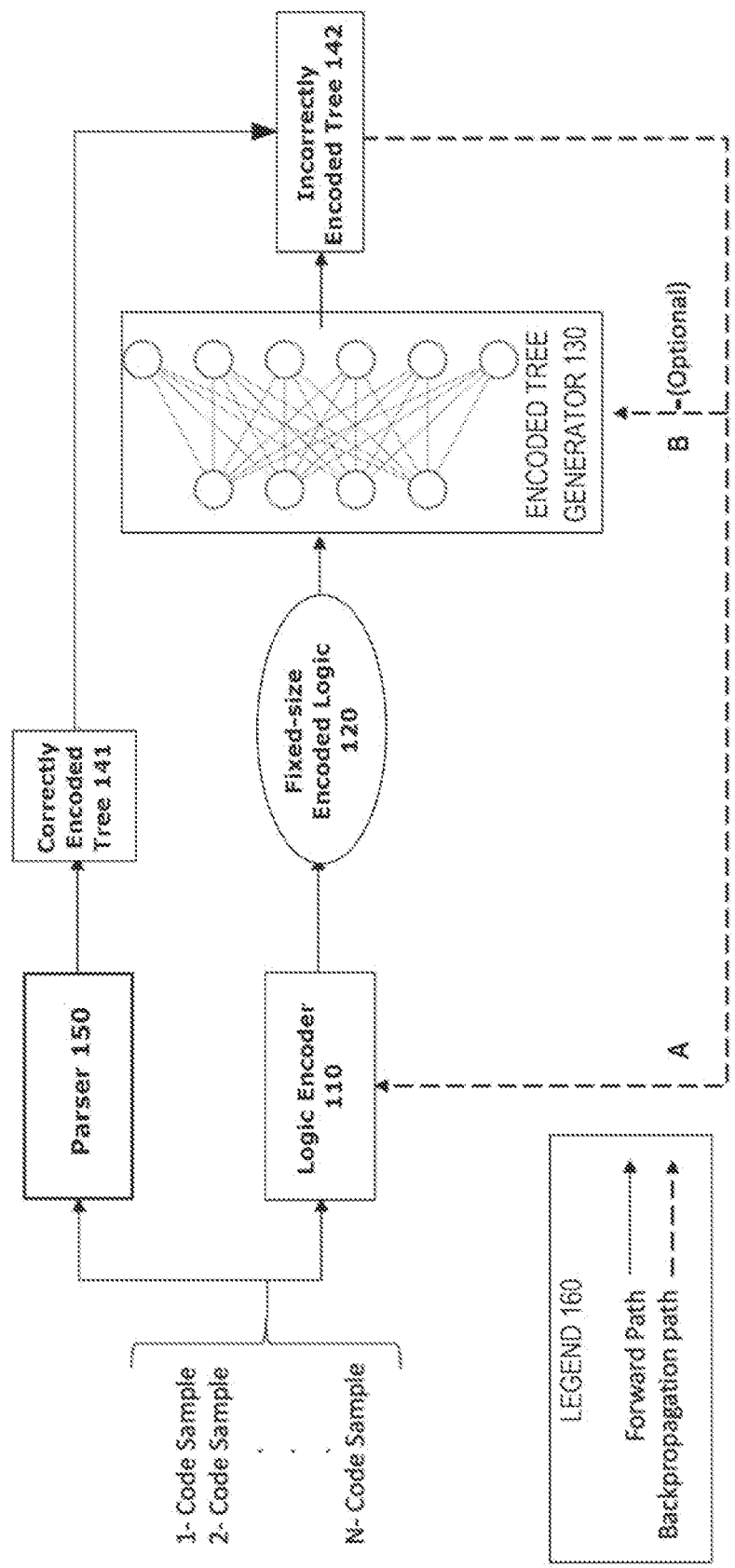
FIG. 1 is a block diagram that depicts an example finetuning artificial neural network (ANN) that uses natural language processing (NLP) and an encoded tree generator to finetune a pretrained logic encoder that infers a fixed-size encoded logic from source logic such as a code sample.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Based on natural language processing (NLP) herein, a novel encoded tree generator is used for novel finetuning of a pretrained logic encoder that infers a fixed-size encoded logic from source logic. Herein is a robust and efficient framework to inject structural syntactic and semantic information of programming languages into language models.

Each programming language follows formal grammar which is defined based on a set of strict deterministic rules such as production rules. In order to transform a programming language code into a set of executable commands, the compiler of the programming language uses a tree style structure, such as a parse tree or abstract syntax tree (AST) derived from the source code by parsing.

Language models are built for the purpose of processing natural language. One of the main differences between natural language and programming languages is the ASTs. The information in an AST has a very high perplexity (i.e. probability of confusing a machine learning model), and although identifying the obscure structural syntactic and semantic information using these language models is still achievable, it needs a large amount of data, with large language models and with high cost of training. Herein is a finetuning framework which can inject the information from ASTs into the pretrained language models robustly and efficiently. Using this framework, the computational cost and size of data needed is much less and the final language model learns AST information more accurately.

In an embodiment, the language model is bidirectional encoder representations from transformers (BERT) that was originally designed for NLP. BERT may be used herein as an encoder that infers a fixed size vector from a variable size (e.g. token count) code. Any language model herein may be implemented with BERT.

Herein, language models and, for example, BERT are applied to programming languages. Each language model learns to represent a given piece of code in vector form. The content and treatment of the code characterizes the learning as follows. If the code contains a mix of logic and prose (i.e. natural language) comments and the language model interprets both logic and prose, then the learning is bimodal. If the code lacks comments or the comments are ignored during training, then the learning is unimodal. Herein, learning is multimodal because the training input includes AST information, which is a third mode.

The pretrained models can be finetuned for various downstream tasks such as code completion, code translation, and document generation. The model's success in facilitating downstream tasks relies on many factors including the model's ability to capture structural, semantic, and syntactic information in the code. Finetuning pretrained language models is a self-supervised training task where the model is re-trained on a small task-specific dataset. The pretrained model's weights are updated to account for the task specific data.

Herein is an efficient approach to finetune pretrained language models (e.g. BERT) for improved code representation. This includes a new training objective for the language model referred to herein as AST path prediction (APP) to incorporate AST information into the language model robustly. The AST information is not fed into the language model in a feed-forward path, but the AST information instead flows into the language model in a backward path using neural backpropagation.

This framework for finetuning language models injects AST structural information into the language model in a robust way. The framework is composed of two phases. In the first phase, namely AST path prediction (APP), the AST of a given code is built and it is converted into a numerical vector that is a frequency histogram of predetermined AST paths which can be used as a self-supervised label to provide training feedback to a neural network that is a generator model. The generator model accepts code as input and generates a summarization of the AST of the code, and the summarization is another instance of that path frequency vector.

The generator model should have a large capacity (high number of parameters) enough to learn the knowledge and information of extracting ASTs from any sample of code. Thus, the first phase involves training the generator model to learn robustly the knowledge of mapping codes to their ASTs. Herein, code is source logic such as in a sample, a snippet, a script, or a source file. Code may be textual or tokenized as a sequence of tokens that represent literals such as keywords, quoted strings, numbers, and punctuation.

In the second phase of the NLP pipeline, the generator model from the APP is employed to transfer the knowledge to a language model. This language model was pretrained using arbitrary proxy tasks and is finetuned by this methodology. By defining a training objective as the accuracy of the AST path prediction, neural weights of the language model can be updated. This update carries the knowledge of the generator model of ASTs into the language model to reflect both structural syntactic and semantics of the code. The neural weights of the generator model can be fixed in this scenario or updated too. Finetuning both generator model and the language model simultaneously achieves the highest accuracy.

Using this framework, a language model can be finetuned by learning the ASTs of code, which in turn will convey the structural, syntactic, and semantic information of the code into the model's outputs. This approach includes at least the following advantages.

Extracted paths represent structural syntactic and semantic details in the source code. The language model, as finetuned with an AST path prediction objective, captures semantic code details when representing code in vector form compactly and accurately.

The amount of data and computation cost using this methodology is low.

Higher accuracy of downstream tasks such as document recommendation because the finetuned model has learnt structural syntactic and semantic information.

Straightforward implementation of the framework.

There is no need to train a whole language model from scratch. This framework only finetunes a pretrained language model for a few epochs which makes it very efficient.

Possibility of using any pretrained language model which can carry information from other tasks into downstream tasks.

AST generation is only needed during training time.

In an embodiment, a computer stores and operates a logic encoder that is an artificial neural network that infers a fixed-size encoded logic from textual or tokenized source logic. Without machine learning, a special parser generates a parse tree that represents the source logic and a fixed-size correctly encoded tree that represents the parse tree. For finetuning the logic encoder, an encoded tree generator is an artificial neural network that accepts the fixed-size encoded logic as input and responsively infers a fixed-size incorrectly encoded tree that represents the parse tree. The neural weights of the logic encoder (and optionally of the encoded tree generator) are adjusted based on backpropagation of error (i.e. loss) as a numerically measured difference between the fixed-size incorrectly encoded tree and the fixed-size correctly encoded tree.

1.0 Example Training Computer

FIG. 1 is a block diagram that depicts an example finetuning artificial neural network (ANN) 100 that is stored within and operated by an example computer. In an embodiment, ANN 100 uses natural language processing (NLP) and encoded tree generator 130 to finetune pretrained logic encoder 110 that infers fixed-size encoded logic 120 from source logic such as any of code samples 1-N. The example computer may be one or more of a rack server such as a blade, a personal computer, a mainframe, or a virtual computer.

Each of code samples 1-N is text that contains one or more logic statements for a same formal computer language such as a scripting language such as python or JavaScript, or for a compiled programming language such as C++ or Java. For example, code sample 1 may be a python script in a text editor such as an integrated development environment (IDE), a C source file in a filesystem, or dynamically received or generated JavaScript in a web browser.

1.1 Logic Encoder

In an embodiment, logic encoder 110 is multiple neural layers in ANN 100. ANN 100 may be used to finetune pretrained logic encoder 110. In an embodiment, encoded tree generator 130 is multiple neural layers in ANN 100 that provide a self-supervised training goal (i.e. objective) for ANN 100. The computer of ANN 100 tokenizes code sample 1 into a variable-length sequence of lexical tokens (not shown) that logic encoder 110 accepts as input.

Logic encoder 110 was already pretrained to infer fixed-size encoded logic 120 for input code of a particular programing language. Logic encoder 110 is finetuned herein to increase accuracy of fixed-size encoded logic 120 and accelerate training and increase accuracy of a downstream model (not shown) in a downstream application.

Example downstream applications may or may not be interactive (e.g. in an IDE) and include source logic completion, source logic translation, source logic documentation generation, and programing reference material recommendation. Downstream applications require deployment of logic encoder 110 but, as discussed later herein, not encoded tree generator 130. Downstream applications presume logic encoder 110 is already finetuned as discussed later herein.

1.2 Finetuning Architecture

Finetuning herein is self-supervised because the correct inference (i.e. reconstruction) by encoded tree generator 130 is original code sample 1. In other words, encoded tree generator 130 infers missing tokens, and inferring an incorrect token is a measurable error. By neural backpropagation, training error is used to adjust neural weights in neural components 100, 110 and, as discussed later herein, optionally also encoded tree generator 130 to cause increased accuracy by representation learning. In other words, encoded tree generator 130 provides feedback that finetunes logic encoder 110 to more accurately infer fixed-size encoded logic 120.

Finetuning of neural components 110 and 130 has increased accuracy and is accelerated by correctly encoded tree 141 as a self-supervision label for comparison with incorrectly encoded tree 142 that is inferred by encoded tree generator 130.

For finetuning in FIG. 1, data flows from code samples 1-N shown on the left in a training corpus, through components 110 and 130, to incorrectly encoded tree 142 shown on the right. Logic encoder 110 accepts code sample 1 (e.g. as a token sequence) as input and responsively infers fixed-size encoded logic 120. Encoded tree generator 130 accepts fixed-size encoded logic 120 as input and responsively infers incorrectly encoded tree 142 that is an approximation of correctly encoded tree 141 that is generated by parser 150 to represent a parse tree of code sample 1. ANN 100 does not contain parser 150.

Encoded trees 141-142 are lossy fixed-size encodings of the parse tree of code sample 1. The fixed size of encoded trees 141-142 may be the same or different from the fixed size of encoded logic 120. Feature vectors 120 and 141-142 each are a one-dimensional array of numbers. Herein, a fixed size may be a predefined count of bytes or a predefined count of features (i.e. numbers as array elements).

1.3 Neural Backpropagation of Error

If either component 110 or 130 is inaccurate, then encoded trees 141-142 do not exactly match, even though encoded trees 141-142 represent same code sample 1. A numeric difference between numbers at a same array offset in encoded trees 141-142 may be measured such as by arithmetic subtraction. A numeric difference between encoded trees 141-142 may be measured such as by mean square error (MSE) of the differences at all array offsets in encoded trees 141-142. Numeric differences may be referred to herein as error or loss which may, in an embodiment, be inversely proportional to accuracy.

If encoded trees 141-142 are identical, then the error is zero. To accomplish representation learning, neural backpropagation of the measured error may adjust neural weights within components 100, 110, and 130. The magnitude of the weights adjustment may be proportional to the error.

According to legend 160, the solid arrows indicate a forward path of training dataflow in which components 110 and 130 generate respective inferences, and parser 150 provides self-supervision labels. According to legend 160, the dashed arrows indicate a backward (i.e. backpropagation of error) path of training dataflow in which corrective adjustment A is applied to the neural weights of logic encoder 110 to finetune logic encoder 110. As shown, backpropagation may optionally apply corrective adjustment B to the neural weights of encoded tree generator 130 to finetune encoded tree generator 130 as discussed later herein.

2.0 Example Training and Inferencing Process

Figure 2:
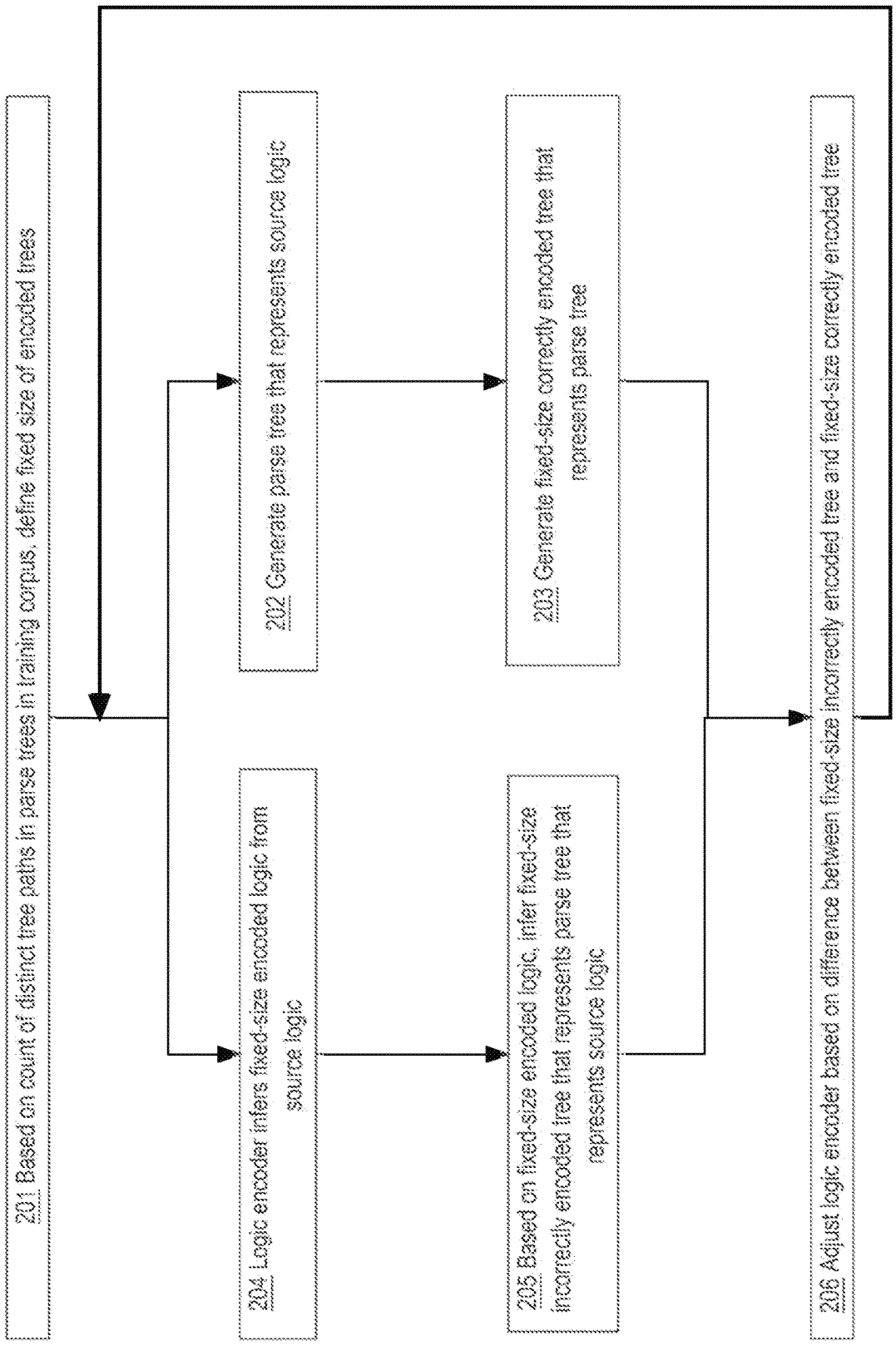
FIG. 2 is a flow diagram that depicts an example computer process to finetune and deploy, into production, a logic encoder to infer a fixed-size encoded logic from new source logic.

FIG. 2 is a flow diagram that depicts an example computer process to finetune and deploy, into production, logic encoder 110 to infer a fixed-size encoded logic from a source logic. Preparation step 201 prepares a training corpus that contains code samples 1-N that finetuning steps 202-206 use to finetune logic encoder 110 (e.g. for a particular downstream application).

For FIG. 2, components 110 and 130 were already pretrained for a particular programming language but not finetuned for a particular downstream application. Encoded tree generator 130 was already pretrained in a way presented later herein. There are two training corpuses in the lifecycle of logic encoder 110. The first is a pretraining corpus for pretraining for the particular programing language. The second corpus is for finetuning. The finetuning corpus is smaller because it contains fewer code samples, and those code samples are selected from the particular downstream application. The training corpus for FIGS. 1-2 is the finetuning corpus.

Based on a count of distinct tree paths in parse trees in the finetuning corpus, preparatory step 201 defines a fixed size of encoded trees 141-142, where size is a count of features (i.e. numeric array elements) or a count of bytes. This count of features is a count of distinct tree paths that occur in the finetuning corpus (i.e. code samples 1-N). For example, parser 150 may generate a respective parse tree (not shown) for each of code samples 1-N.

From each parse tree may be extracted respective many tree paths including duplicate tree paths from a same or different parse tree. The respective frequency (i.e. count) of duplicates is tallied for each distinct tree path. In an embodiment, tree paths with frequencies below a threshold that is a predefined frequency or rank are excluded from training.

Which tree paths are extracted depends on the tree path extraction algorithm(s) of the embodiment. For example, some tree path extraction algorithms may distinguish leaf (i.e. terminal) tree nodes from non-terminal tree nodes. Step 201 may use one, some, or all of the following example tree path extraction algorithms: n-grams, terminal-to-terminal paths, root-to-terminal paths, and cross-node paths. In an embodiment, n-grams or cross-node paths should not contain leaf nodes. Here, an n-gram is a small sequence of contiguously traversed tree nodes. In an embodiment, only tree paths are extracted that have at least a minimum and/or at most a maximum count of tree nodes.

An embodiment may have a predefined maximum count (e.g. a thousand) of distinct tree paths in the finetuning corpus. In that case, the tree paths are ranked (i.e. sorted) by frequency and the, for example, top one thousand tree paths having the highest frequencies are used for finetuning, and the less frequent tree paths are excluded from finetuning.

In any case, encoded trees 141 contain a fixed count of numeric features as defined by step 201. Encoded trees 141-142 are feature vectors, and step 201 decides the width of those feature vectors.

In the shown embodiment, steps 202-203 occur concurrently to steps 204-205. In the shown embodiment, steps 202-205 are followed by step 206 from which an upwards arrow flows back to repeat steps 202 and 204. In other words, FIG. 2 has an iterative loop. Each iteration of that loop may, depending on the embodiment, process a next one of code samples 1-N, or process a next batch of code samples or, in an iteration referred to herein as an epoch, process all of code samples 1-N. Demonstratively discussed below is a current code sample, which is the code sample of the current iteration, which may be one code sample, a batch of code samples, or the entire training corpus of code samples.

Step 202 generates a parse tree that represents a source logic (i.e. the current code sample). As discussed above, an iteration may entail one or many code samples, in which case step 202 generates respective parse trees. In an embodiment refactored for acceleration, step 202 is hoisted (i.e. excluded from the iterative loop) and combined into preparatory step 201. That is, step 201 may perform step 202 for the entire finetuning corpus. In that case, the finetuning corpus may retain the parse trees.

Step 203 generates fixed-size correctly encoded tree 141 that represents the parse tree of the current code sample. Herein, a code sample and a source logic are synonymous. As discussed earlier herein, step 203 may invoke a tree path extraction algorithm to extract many tree paths from the parse tree of the current code sample. For the parse tree of the current code sample, fixed-size correctly encoded tree 141 is a frequency histogram of (e.g. the top thousand) distinct tree paths in the finetuning corpus.

If a tree path of the top thousand tree paths does not occur in the parse tree of the current code sample, then that tree path has a frequency of zero, which is recorded in a respective array element of fixed-size correctly encoded tree 141. If the tree path instead occurs twice in the parse tree of the current code sample, then that tree path has a frequency of two.

In an embodiment refactored for acceleration, step 203 is hoisted (i.e. excluded from the iterative loop) and combined into preparatory step 201. That is, step 201 may perform step 203 for the entire training corpus. In that case, the training corpus may retain the fixed-size correctly encoded trees of all of the parse trees.

Steps 204-206 necessarily are finetuning steps and should occur in the iterative loop. In step 204, logic encoder 110 accepts a source logic (i.e. the current code sample) and infers fixed-size encoded logic 120 from the source logic. For example, step 204 may tokenize the source logic into a sequence of lexical tokens that logic encoder 110 accepts as input.

Based on fixed-size encoded logic 120, in step 205, encoded tree generator 130 accepts fixed-size encoded logic 120 as input and infers fixed-size incorrectly encoded tree 142 that represents the parse tree of the source logic. For the current code sample, fixed-size incorrectly encoded tree 142 is an inaccurate frequency histogram of (e.g. the top thousand) distinct tree paths in the finetuning corpus. To infer fixed-size incorrectly encoded tree 142, step 205 does not use the parse tree that represents source logic. Step 205 does not use nor generate a parse tree.

Step 206 may compare encoded trees 141-142 to measure error or loss as an arithmetic difference, and step 206 backpropagates the measured difference as discussed earlier herein. Step 206 applies corrective adjustment A as shown in FIG. 1. In an embodiment, step 206 also applies corrective adjustment B to finetune encoded tree generator 130 as discussed earlier herein. Backpropagation step 206 adjusts (i.e. finetunes) neural weights of logic encoder 110 and, in an embodiment, neural weights of encoded tree generator 130.

After step 206 of a previous iteration, a next iteration may repeat step 204 (and step 202 if not hoisted as discussed above). Too many iterations may cause overfitting that is counterproductive by undoing some of the previous pretraining of components 110 and/or 130. To prevent overfitting and unlike the state of the art, an embodiment may cease iterating based solely on a maximum count of iterations (i.e. code samples, batches, or epochs) and not based on fitness (i.e. accuracy) such as in the state of the art.

3.0 Encoded Tree Generator Pretraining

As discussed earlier herein, logic encoder 110 may already be pretrained for a particular programming language in known ways such as BERT training. However, the process of FIG. 2 presumes that both of components 110 and 130 are already pretrained. Pretraining of encoded tree generator 130 may occur as follows.

The architecture for pretraining encoded tree generator 130 is as shown in FIG. 1, except that only corrective adjustment B occurs but not corrective adjustment A. In this case, logic encoder 110 is already pretrained but not finetuned, and encoded tree generator 130 is untrained.

Pretraining of encoded tree generator 130 occurs by repeatedly applying corrective adjustment B while using the pretraining corpus discussed earlier herein or the finetuning corpus that contains code samples 1-N. After pretraining encoded tree generator 130, the finetuning process of FIG. 2 may occur.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
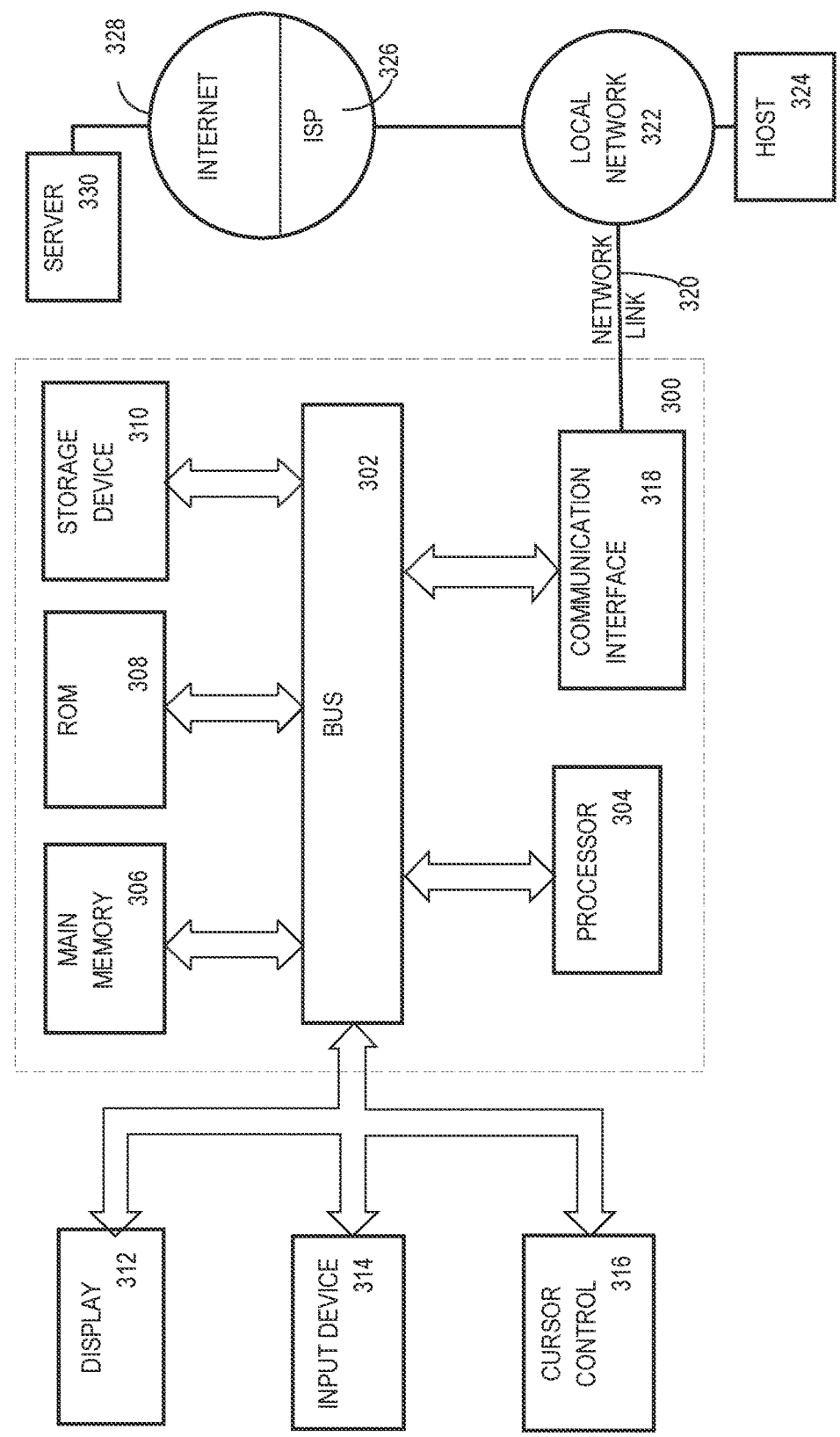
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

Figure 4:
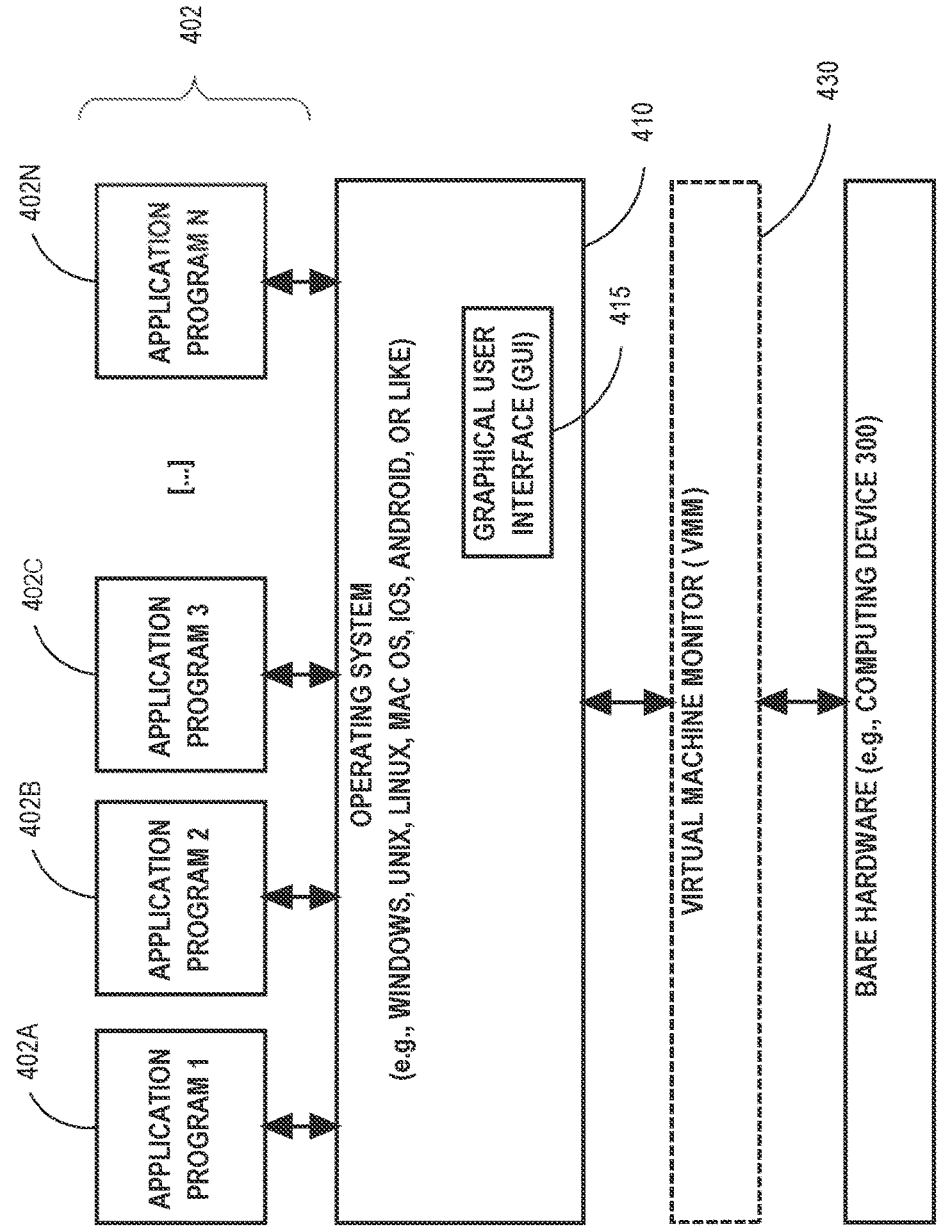
FIG. 4 is a block diagram that illustrates a basic software system that may be employed for controlling the operation of a computing system.

FIG. 4 is a block diagram of a basic software system 400 that may be employed for controlling the operation of computing system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/or serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2 (1): 1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
increasing accuracy of a logic encoder that is a bidirectional encoder by finetuning the logic encoder, including repeating in a predetermined count of repetitions:
a) inferring, by the logic encoder, a fixed-size encoded logic from a source logic;
b) generating a parse tree that represents the source logic;
c) generating a fixed-size correctly encoded tree that represents the parse tree that represents the source logic;
d) inferring, based on the fixed-size encoded logic, by an encoded tree generator, a fixed-size incorrectly encoded tree that represents the parse tree that represents the source logic; and
e) neural backpropagating, in the logic encoder, a difference between the fixed-size incorrectly encoded tree and the fixed-size correctly encoded tree; and
performing after said increasing the accuracy of the logic encoder:
deploying, into a production environment, the logic encoder without the encoded tree generator;
generating, by the logic encoder, a second fixed-size encoded logic for a second source logic in an integrated development environment (IDE); and
performing, by the IDE based on the second fixed-size encoded logic, source logic completion;
wherein the method is performed by one or more computers.

2. The method of claim 1 wherein:
said inferring the fixed-size incorrectly encoded tree is performed by the encoded tree generator;
the method further comprises adjusting the encoded tree generator based on said difference between the fixed-size incorrectly encoded tree and the fixed-size correctly encoded tree.

3. The method of claim 1 further comprising sizing, based on a count of distinct tree paths in parse trees in a training corpus, the fixed-size correctly encoded tree and the fixed-size incorrectly encoded tree.

4. The method of claim 1 wherein said inferring the fixed-size incorrectly encoded tree comprises inferring a plurality of distinct tree paths in the parse tree that represents the source logic.

5. The method of claim 4 wherein said inferring the plurality of distinct tree paths comprises inferring a respective count of each tree path in the plurality of distinct tree paths.

6. The method of claim 1 wherein said generating the fixed-size correctly encoded tree is based on at least one selected from a group consisting of: a predefined minimum path length, a predefined maximum path length, and nonterminal nodes of the parse tree that represents the source logic but not terminal nodes.

7. The method of claim 1 further comprising based on the second fixed-size encoded logic, performing at least one selected from a group consisting of: source logic translation, source logic documentation generation, and programing reference material recommendation.

8. One or more non-transitory computer-readable media storing instructions that, when executed by one or more processors, cause:
increasing accuracy of a logic encoder that is a bidirectional encoder by finetuning the logic encoder, including repeating in a predetermined count of repetitions:
a) inferring, by the logic encoder, a fixed-size encoded logic from a source logic;
b) generating a parse tree that represents the source logic;
c) generating a fixed-size correctly encoded tree that represents the parse tree that represents the source logic;
d) inferring, based on the fixed-size encoded logic, by an encoded tree generator, a fixed-size incorrectly encoded tree that represents the parse tree that represents the source logic; and
e) neural backpropagating, in the logic encoder, a difference between the fixed-size incorrectly encoded tree and the fixed-size correctly encoded tree; and
performing after said increasing the accuracy of the logic encoder:
deploying, into a production environment, the logic encoder without the encoded tree generator;
generating, by the logic encoder, a second fixed-size encoded logic for a second source logic in an integrated development environment (IDE); and
performing, by the IDE based on the second fixed-size encoded logic, source logic completion.

9. The one or more non-transitory computer-readable media of claim 8 wherein:
said inferring the fixed-size incorrectly encoded tree is performed by the encoded tree generator;
the instructions further cause adjusting the encoded tree generator based on said difference between the fixed-size incorrectly encoded tree and the fixed-size correctly encoded tree.

10. The one or more non-transitory computer-readable media of claim 8 wherein the instructions further cause sizing, based on a count of distinct tree paths in parse trees in a training corpus, the fixed-size correctly encoded tree and the fixed-size incorrectly encoded tree.

11. The one or more non-transitory computer-readable media of claim 8 wherein said inferring the fixed-size incorrectly encoded tree comprises inferring a plurality of distinct tree paths in the parse tree that represents the source logic.

12. The one or more non-transitory computer-readable media of claim 11 wherein said inferring the plurality of distinct tree paths comprises inferring a respective count of each tree path in the plurality of distinct tree paths.

13. The one or more non-transitory computer-readable media of claim 8 wherein said generating the fixed-size correctly encoded tree is based on at least one selected from a group consisting of: a predefined minimum path length, a predefined maximum path length, and non-terminal nodes of the parse tree that represents the source logic but not terminal nodes.

14. The one or more non-transitory computer-readable media of claim 8 wherein the instructions further cause based on the second fixed-size encoded logic, performing at least one selected from a group consisting of: source logic translation, source logic documentation generation, and programing reference material recommendation.

* * * * *